(12) United States Patent
Utsubo (10) Patent No.: US 8,520,238 B2
(45) Date of Patent: Aug. 27, 2013

(54) PRINTING APPARATUS AND PRINTING SYSTEM HAVING FAULT RECOVERY

(75) Inventor: Yoshiaki Utsubo, Tokyo (JP)

(73) Assignee: Oki Data Corporation, Tokyo (JP)

( * ) Notice: Subject to any disclaimer, the term of this patent is extended or adjusted under 35 U.S.C. 154(b) by 363 days.

(21) Appl. No.: 12/625,811

(22) Filed: Nov. 25, 2009

(65) Prior Publication Data

US 2010/0141986 A1 Jun. 10, 2010

(30) Foreign Application Priority Data

Dec. 8, 2008 (JP) ................................ 2008-312636

(51) Int. Cl.
 *G06F 3/12* (2006.01)
(52) U.S. Cl.
 USPC ....................................................... 358/1.15
(58) Field of Classification Search
 None
 See application file for complete search history.

(56) References Cited

U.S. PATENT DOCUMENTS

2003/0011803 A1* 1/2003 Peter et al. .................. 358/1.14
2005/0286078 A1* 12/2005 Maruyama .................. 358/1.15

FOREIGN PATENT DOCUMENTS

JP 2003-323276 A 11/2003

* cited by examiner

*Primary Examiner* — Jeremiah Bryar
(74) *Attorney, Agent, or Firm* — Marvin A. Motsenbocker; Mots law, PLLC (57) ABSTRACT

A printing apparatus includes: a printed range store unit configured to store a printed range, which is a part of a first print data that is completely printed; a print completion determination unit configured to determine whether or not the printing of the first print data has been completed; a print job determination unit configured to determine whether or not a second print data correspond with the first print data; an unprinted page determination unit configured to determine unprinted pages of the second print data based on the print range stored by the printed range store unit, when the print job determination unit determines that the second print data correspond with the first print data; and a print control unit configured to instruct a print unit to print based on the second print data and the result of the unprinted page determination unit.

17 Claims, 9 Drawing Sheets

| 311A LOG NUMBER | 311B JOB NAME | 311C HOST NAME | 311D PRINT EXECUTION TIME | 311E PRINTED RANGE | 311F PRINT COMPLETION FLAG |
|---|---|---|---|---|---|
| 1 | DOC1 | PC-1 | 20080718154530 | 3 | 0 |
| | | | | | |
| | | | | | |
| | | | | | |

311 JOB LOG TABLE

PRINTING APPARATUS AND PRINTING SYSTEM HAVING FAULT RECOVERY

CROSS REFERENCE TO RELATED APPLICATIONS

This application claims priority based on 35 USC 119 from prior Japanese Patent Application No. 2008-312636 filed on Dec. 8, 2008, entitled "PRINTING APPARATUS AND PRINTING SYSTEM", the entire contents of which are incorporated herein by reference.

BACKGROUND OF THE INVENTION

1. Field of the Invention

The invention relates to a printing apparatus and a printing system capable of printing received print data.

2. Description of Related Art

In a printing apparatus such as a printer, when an error such as a paper jam or the like occurs during a printing process based on print data that is sent from a host computer or an external apparatus, the printing process is suspended. In this situation, if the printing apparatus is turned off, the received print data is cleared in the printing apparatus. After that, when the printing apparatus is turned on again, all the print data is resent from the host computer to the printing apparatus and thus the printing apparatus reprints the print data from the first to the last page (for example, see Japanese Patent Application Laid-Open No. 2003-323276).

However, the printing apparatus receives the print data that are resent from the host computer after the error and reprints all the resent print data from the beginning to the end. The printing apparatus thus prints pages that had been properly printed before the error. This causes duplicate printing and waste of paper.

SUMMARY OF THE INVENTION

A first aspect of the invention is a printing apparatus for printing based on first print data and second print data that are received by the print apparatus, including: a printed range store unit configured to store a printed range, which is a part of the first print data that is completely printed; a print completion determination unit configured to determine whether or not the printing of the first print data has been completed; a print job determination unit configured to determine whether or not the second print data correspond with the first print data; an unprinted page determination unit configured to determine unprinted pages of the second print data based on the print range stored by the printed range store unit, when the print job determination unit determines that the second print data correspond with the first print data; and a print control unit configured to instruct a print unit to print based on the second print data and the result of the unprinted page determination unit, when the print completion determination unit determines that the printing of the first print data has not been completed and the print job determination unit determines that the second print data correspond with the first print data.

A second aspect of the invention is a printing system including: a host apparatus; and a printing apparatus configured to execute printing based on print data that are received from the host apparatus. The host apparatus including: a transmission unit configured to transmit print data to the printing apparatus; a first print completion determination unit configured to determine whether or not printing of the print data has been completed; and a print job management unit configured to transmit via the transmission unit second print data which are the same print job as first print data that were transmitted to the printing apparatus prior to the second print data, when the first print completion determination unit determines that the printing of the first print data has not been completed in the printing apparatus after the first print data were transmitted from the transmission unit. The printing apparatus including: a printed range store unit configured to store a printed range, which is a part of the first print data that has been printed completely; a second print completion determination unit configured to determine whether or not the printing of the first print data has been completed; a print job determination unit configured to determine whether or not the second print data corresponds with the first print data; an unprinted page determination unit configured to determine unprinted pages of the second print data based on the print range stored by the printed range store unit, when the print job determination unit determines that the second print data corresponds with the first print data; and a print control unit configured to instruct a print unit to print based on the second print data and the unprinted page determination unit, when the second print completion determination unit determines that the printing of the first print data has not been completed and the print job determination unit determines that the second print data corresponds with the first print data.

A third aspect of the invention is a printing apparatus for printing based on print data that are received by the printing apparatus, including: a print job determination unit configured to determine whether or not print data correspond with previous print data that were received by the printing apparatus prior to the print data; a page determination unit configured to determine unprinted pages or printed pages of the previous print data, when the print job determination unit determines that the print data correspond with the previous print data; and a print control unit configured to instruct a print unit to print the print data based on the determination result of the unprinted page determination unit, when the print job determination unit determines that the print data correspond with the previous print data.

According to the aspects of the invention, even if the printing apparatus receives the same print data more than once due to rebooting thereof, the aspects prevent duplicate printing of pages that had been already printed before the rebooting and thereby preventing waste of paper.

DETAILED DESCRIPTION OF EMBODIMENTS

Hereinafter, embodiments of the invention will be described with reference to the drawings. In the respective drawings referenced herein, the same constituents are designated by the same reference numerals and duplicate explanation concerning the same constituents is basically omitted.

Note that although the embodiments describe a printer as an example, the printing apparatus according to the invention includes a copy machine, facsimile machine or the like that have a printing function.

First Embodiment (Configuration)

Figure 1:
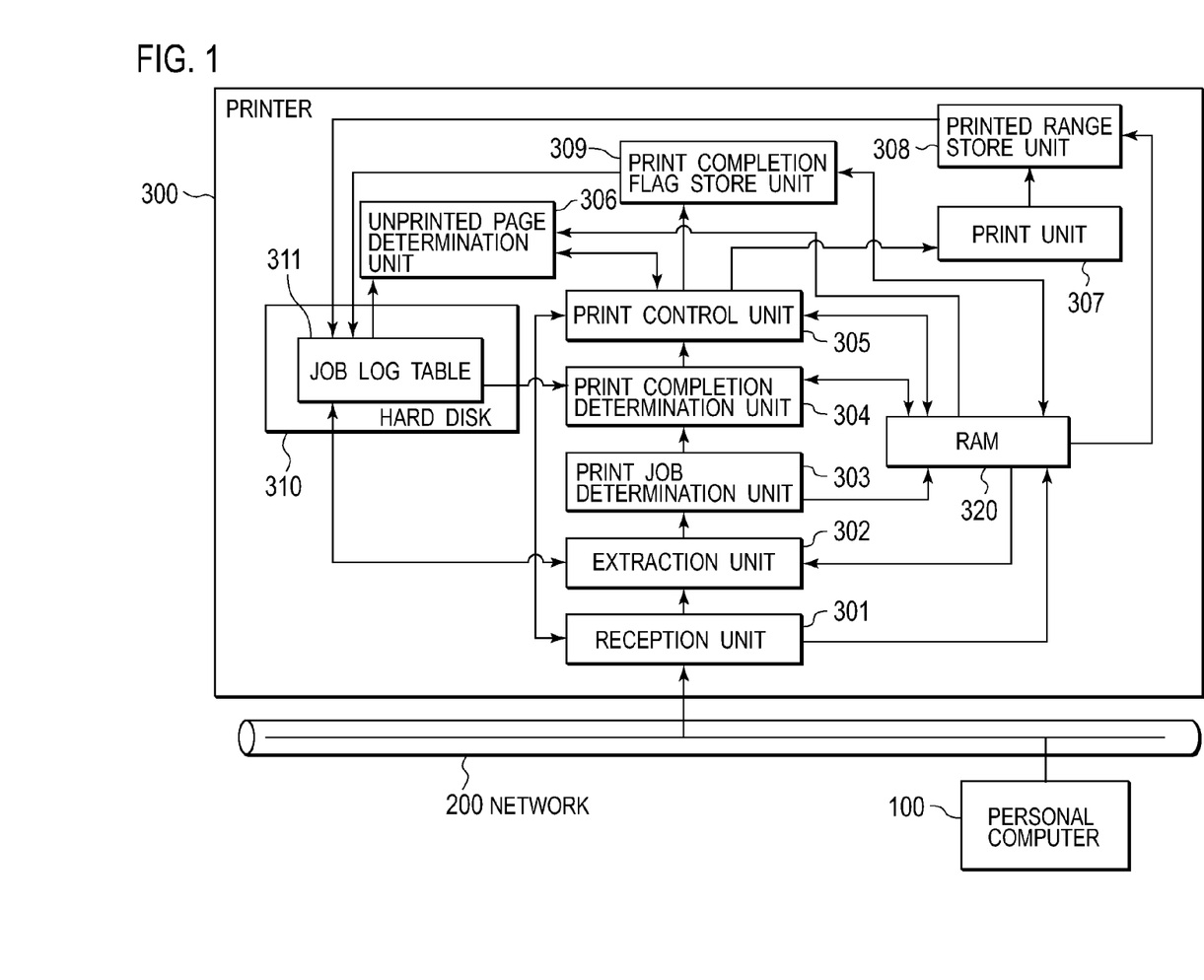
FIG. 1 is a functional block diagram of a printing apparatus of a first embodiment.
Figure 2:
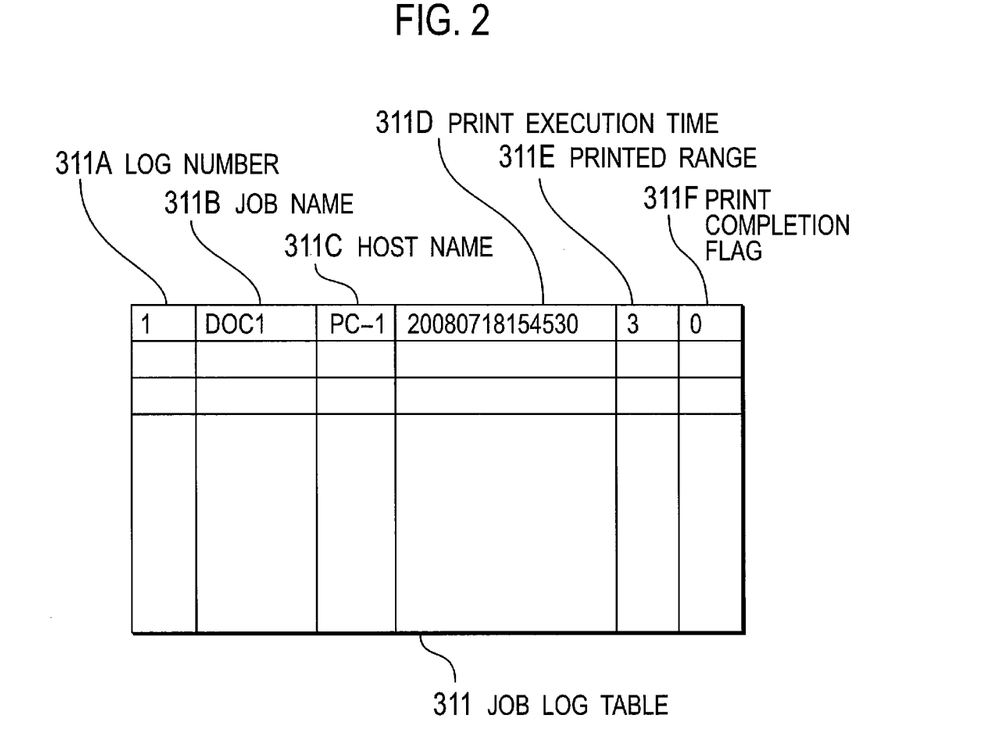
FIG. 2 is a block diagram of a job log table of the printing apparatus of the first embodiment.

A configuration of a printing apparatus of a first embodiment will be described with reference to FIGS. 1 and 2. FIG. 1 is a block diagram of a functional configuration of the printing apparatus, showing a configuration of a printing system, and FIG. 2 is a block diagram of a job log table.

In the first embodiment, as shown in FIG. 1, printer 300 serving as a printing apparatus is connected to personal computer 100 via network 200 such that personal computer 100 and printer 300 can communicate with each other via network 200.

Upon a print instruction from an application (not shown), personal computer 100 creates print data serving as first print data including attribute information having a job name, a host name and a print execution time, and sends the print data to printer 300. When printer 300 happens to have therein an error such as a jam or the like and then is turned off, sending of the first print data may not be complete. When the first print data are not completely sent, personal computer 100 resends printer 300 the same print data which will be referred to as second print data.

Printer 300 executes printing based on received print data and includes reception unit 301, extraction unit 302, print job determination unit 303, print completion determination unit 304, print control unit 305, unprinted page determination unit 306, print unit 307, printed range store unit 308, print completion flag store unit 309, hard disk 310 and RAM 320.

Hard disk 310 is a nonvolatile storage unit to store job log table 311. As shown in FIG. 2, job log table 311 stores log number 311A, job name 311B, host name 311C, print execution time 311D, printed range 311E and print completion flag 311F, for each entry.

For each print data, a unique number indicating an entry into job log table 311 is stored in log number 311A, and a job name, host name and print execution time extracted from print data are stored in job name 311B, host name 311C and print execution time 311D, respectively. The total page number from the first to the last printed pages of the print data is stored in printed range 311E. In print completion flag 311F, "1" is stored if printing is completed and "0" is stored if printing is not completed.

Referring back to FIG. 1, RAM 320 is a volatile storage unit and stores print data, a log number, a resend flag and a completion flag. As the print data, RAM 320 stores print data received by reception unit 301. As the log number, RAM 320 stores the log numbers stored in job log table 311 that correspond with the print data that have been currently processed.

As the resend flag, RAM 320 stores "1" if the print data currently processed are resend data and stores "0" if the print data currently processed are not resend data. As a completion flag, RAM 320 stores "1" if the print data currently processed have been printed completely and stores "0" if the print data currently processed have not been printed completely.

Reception unit 301 receives print data from personal computer 100 and stores the print data in RAM 320. Reception unit 301 informs extraction unit 302 of the reception when the reception is a first-part reception of the print data, and informs print control unit 305 of the reception when the reception is a subsequent-part reception of the print data. Reception unit 301 suspends receiving of the print data from personal computer 100 when the receiving data exceed a predetermined size, and resumes receiving of the print data in response to a request from print control unit 305.

Extraction unit 302 extracts attribute information such as the job name, the host name and the print execution time from the received print data, and transmits the attribute information to the print job determination unit 30.

Print job determination unit 303 determines whether or not the received print data are resent data. That is, print job determination unit 303 determines that the received print data are resent data if there is an entry in job log table 311 whose attribute information is all identical to the job name, host name and print execution time that print job determination unit 303 received from extraction unit 302, stores the job number of the corresponding entry and the resend flag of "1" into RAM 320, and notifies print completion determination unit 304.

On the other hand, print job determination unit 303 determines that the received data are not resent data if there is not an entry in job log table 311 whose attribute information is all identical to the job name, host name and print execution time that print job determination unit 303 received from extraction unit 302, adds a new entry in job log table 311, writes a number that follows the latest log number into log number 311A, the job name into job name 311B, the host name into host name 311C, print execution time into print execution time 311D, "0" into printed range 311E, "0" into print completion flag 311F, stores the log number of the newly added entry and the resend flag of "0" into RAM 320, and notifies print completion determination unit 304.

Print completion determination unit 304 reads a status ("0" or "1") of print completion flag 311F of the entry stored in job log table 311 whose log number is identical to the log number stored in RAM 320, stores the status into the completion flag of RAM 320, and notifies print control unit 305.

Print control unit 305 does not perform printing of all pages of the print data, when print data of a next subject page to be printed exist in RAM 320 and its completion flag in RAM 320 is "1". Print control unit 305 transmits all pages of the print data to print unit 307 when the completion flag in RAM 320 is "0" and the resend flag in RAM 320 is "0".

When the completion flag in RAM 320 is "0" and the resend flag is "1", print control unit 305 transmits page numbers of the print data page by page to unprinted page determination unit 306. When unprinted page determination unit 306 determines that the subject page is not an unprinted page, print control unit 305 does not perform printing of the subject page. When unprinted page determination unit 306 determines that the subject page is an unprinted page, print control unit 305 transmits the subject page of the print data to print unit 307. When print data of a next subject page to be printed does not exist in RAM 320, print control unit 305 deletes unnecessary print data in RAM 320, and then instructs reception unit 301 to resume receiving un-received print data if the un-received print data exist. If un-received print data do not exist and an un-discharged paper sheet exists, print control unit 305 instructs print unit 307 to discharge the un-discharged paper sheet out of printer 300. If an un-discharged paper sheet does not exist, print control unit 305 notifies completion flag store unit 309.

Unprinted page determination unit 306 determines that the subject page of the print data is an unprinted page if the page number stored in printed range 311E in job log table 311 of the entry whose log number is identical to the log number stored in RAM 320 is smaller than the received page number that is received by unprinted page determination unit 306, and notifies print control unit 305 of the determination result. Unprinted page determination unit 306 determines that the subject page of the print data is not an unprinted page if the page number stored in printed range 311E is equal to or larger than the received page number, and notifies print control unit 305 of the determination result.

Print unit 307 prints print data received from print control unit 305. In case of a double-sided printing, print unit 307 turns over a paper sheet for printing a second side of the paper sheet after printing a first side of the paper sheet. After discharging the paper sheet out of printer 300, print unit 307 transmits the printed page number to printed range store unit 308.

Printed range store unit 308 writes the received printed page number into printed range 311E of the entry in job log table 311 whose log number is identical to the log number stored in RAM 320.

Print completion flag store unit 309 writes "1" into print completion flag 311F of the entry in job log table 311 whose log number is identical to the log number stored in RAM 320, and deletes the log number, resend flag and completion flag in RAM 320, and then, ends the process.

(Operation)

Figure 3:
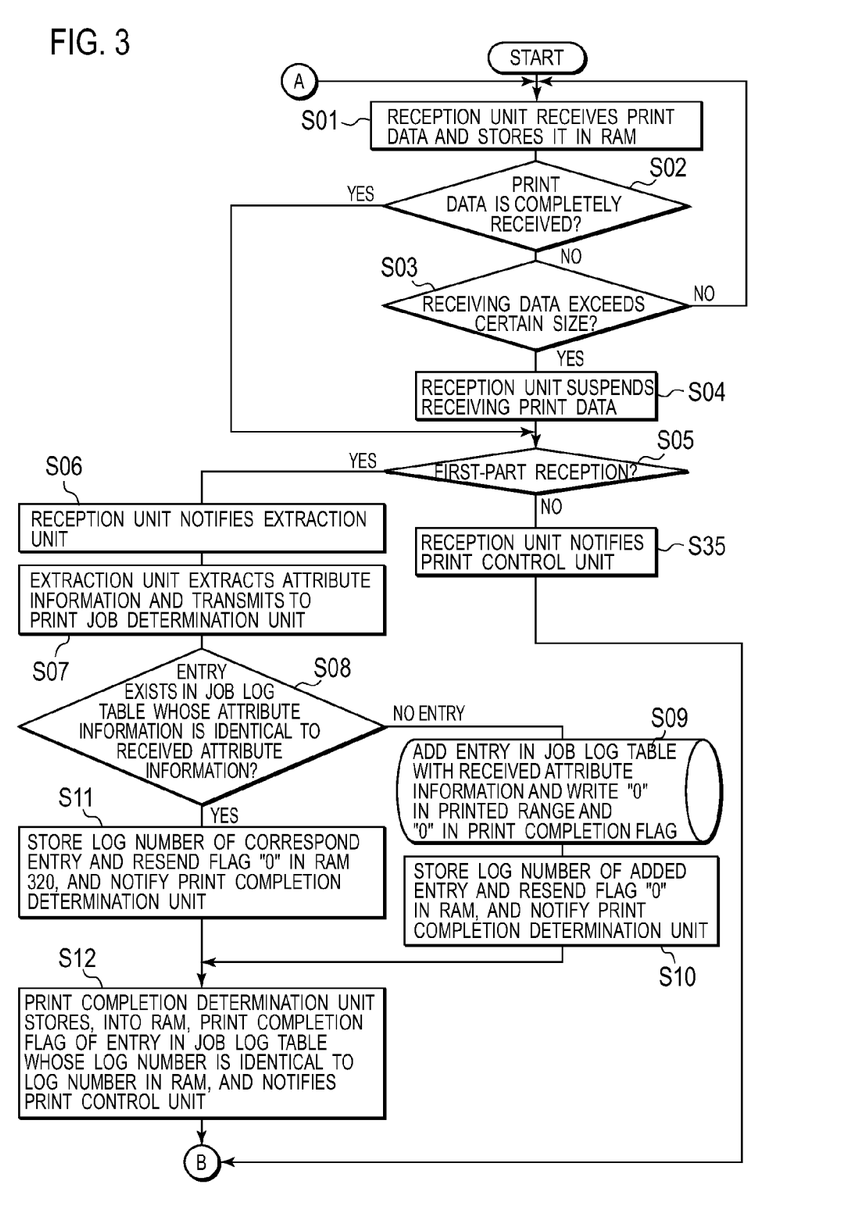
FIG. 3 is a part (a) of an operational flow chart of the printing apparatus of the first embodiment.
Figure 4:
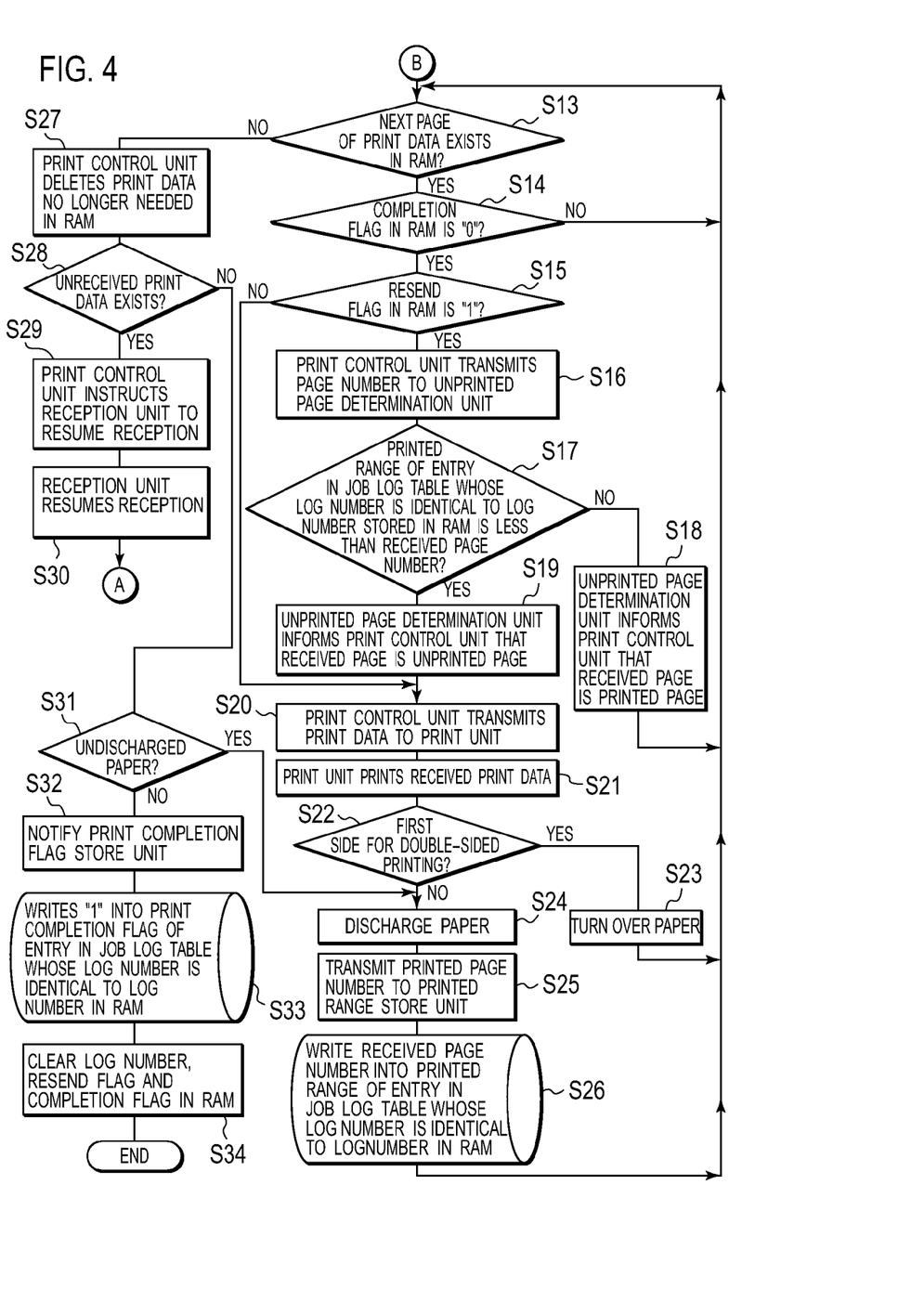
FIG. 4 is a part (b) of the operational flow chart of the printing apparatus of the first embodiment.

With the above configuration, the printing apparatus of the first embodiment operates as follows. The operation will be described in detail with reference to a flow chart in FIGS. 3 and 4. Note that the operation of the printing apparatus of the first embodiment is shown in FIGS. 3 and 4, wherein the flow in FIG. 3 and the flow in FIG. 4 are linked to each other via connections A and B.

The following description describes an example of the operation of the printing apparatus with reference to FIGS. 1 to 4, assuming that personal computer 100 having a host name of "PC-1" creates print data having the job name of "DOC1" for 5-page double-sided printing at "15:45 and 30 seconds on Jul. 18, 2008", personal computer 100 sends printer 300 a part (4 pages) of the print data that does not exceed the capacity of a receive buffer of the printer 100, paper jam occurs in printer 300 when printer 300 prints the 4th page after having printed 3 pages, printer 300 is turned off and on to be rebooted, and then personal computer 100 resends the same print data.

First, personal computer 100 creates print data including "the host name PC-1", "the job name DOC1", "print execution time 20080718154530", and sends the print data to printer 300. Reception unit 301 of printer 300 receives the print data and stores the print data in RAM 320 (step S01). If the print data are not completely received (step S02) and the received data do not exceed the capacity of the receive buffer (step S03), the process returns to step S01 to start to receive the rest of the print data.

In this assumed example, after reception unit 301 receives the 4 pages, the received data exceed the capacity of the receive buffer at a certain size (step S03), reception unit 301 thus suspends further reception of the print data (step S04). Next, reception unit 301 determines that the reception is the first-part reception of the print data (step S05), and then notifies extraction unit 302 (step S06).

Extraction unit 302 extracts attribute information including the host name, job name, print execution time from the print data, and sends the information to print job determination unit 303 (step S07).

Since the reception is the first-part reception, print job determination unit 303 determines that the print data is not resent data, in other words, determines that an entry does not exist in job log table 311 whose attribute information is identical to the job name, host name and print execution time that are received from extraction unit 302 (step S08). Print job determination unit 303 thus adds a new entry for the print data into job log table 311 by writing "1" in log number 311A, "DOC1" in job name 311B, "PC-1" in host name 311C, "20080718154530" in print execution time 311D, "0" in printed range 311E and "0" in print completion flag 311F (step S09). Print job determination unit 303 stores, for the added entry, the log number "1" and the resend flag "0" into RAM 320, and notifies print completion determination unit 304 (step S10).

Next, print completion determination unit 304 stores, into the completion flag of RAM 320, print completion flag "0" of an entry stored in job log table 311 whose log number is identical to the log number "1" stored in RAM 320, and notifies print control unit 305 (step S12). Then the process proceeds to step S13 in FIG. 4 via connection B.

Next, print control unit 305 determines that a next page (the 1st page) of the print data to be printed exists in RAM 320 (step S13) and the completion flag in RAM 320 is "0" (step S14) and the resend flag in RAM 320 is "0" (step S15), and thereby print control unit 305 transmits the 1st page of the print data to print unit 307 (step S20).

Print unit 307 executes printing of the 1st page (step S21), and then, since it is determined that the 1st page is printed on the first side of a paper sheet for double-sided printing (step S22), print unit 307 turns the paper sheet over for printing a next page on the second side of the paper sheet (step S23). Then the process proceeds back to step S13.

Next, print control unit 305 determines that a next page (the 2nd page) of the print data exists in RAM 320 (step S13) and the completion flag in RAM 320 is "0" (step S14) and the resend flag is "0" (step S15), and thereby, print control unit 305 transmits the 2nd page of the print data to print unit 307 (step S20).

Print unit 307 executes printing of the 2nd page (step S21), and then, since it is determined that the 2nd page is printed on the second side of the paper sheet for double-sided printing (step S22), print unit 307 discharges the paper sheet (step S24), and transmits the printed page number "2" to printed range store unit 308 (step S25).

According to the completion of printing 2 pages, which is printing on both sides of a paper sheet for double-sided printing, printed range store unit 308 writes "2" in printed range 311E of the entry in job log table 311 whose log number is identical to the log number "1" stored in RAM 320 (step S26), and the process proceeds back to step S13.

Next, print control unit 305 determines that a next page (the 3rd page) of the print data exists in RAM 320 (step S13) and the completion flag in RAM 320 is "0" (step S14) and the resend flag in RAM 320 "0" (step S15), and thereby, print control unit 305 transmits the 3rd page of the print data to print unit 307 (step S20).

Print unit 307 executes printing of the 3rd page (step S21), and then, since it is determined that the 3rd page is printed on the first side of a paper sheet for double-sided printing (step S22), print unit 307 turns over the paper sheet to the second side of the paper sheet (step S23). Then the process proceeds back to step S13.

Next, print control unit 305 determines that a next page (the 4th page) of the print data exists in RAM 320 (step S13) and the completion flag in RAM 320 is "0" (step S14) and the resend flag is "0" (step S15), and thereby, print control unit 305 transmits the 4th page of the print data to print unit 307 (step S20).

In this assumed example, a paper jam occurs in print unit 307 when printing the 4th page, and the jammed paper sheet is removed by a user, and printer 300 is turned on again after recovery from the paper jam.

At this time, the 1st paper sheet is properly printed on both sides, "1" has been written in log number 311A in job log table 311, "2" has been written in printed range 311E in job log table 311 (in step S26), and "0" has been written in print completion flag 311F in job log table 311 which indicates incompletion of printing the print data.

When printer 300 is restarted, personal computer 100 resends printer 300 the print data having "the host name PC-1", "the job name DOC1", "print execution time 20080718154530" because personal computer 100 has not completed the transmission of the print data. Then reception unit 301 of the printer 300 receives the same print data again. If reception unit 301 determines that the print data are not completely received (step S02) and the received data do not exceed the capacity of the receive buffer (step S02), the process proceeds back to the step S01 to start to receive the rest of the print data.

In this assumed example, after reception unit 301 receives 4 pages, the received data exceed the capacity of the receive buffer at the certain size (step S03), and then reception unit 301 suspends further reception of the print data (step S04), determines that the reception is the first-part reception of the print data (step S05), and notifies extraction unit 302 (step S06).

Extraction unit 302 extracts attribute information including the host name, job name and print execution time from the print data, and transmits the information to print job determination unit 303 (step S07).

Print job determination unit 303 determines that the print data are resent data, in other words, determines that the entry exists in job log table 311 which has the same job name, host name and print execution time as the attribute information received from extraction unit 302 (step S08). Then, print job determination unit 303 stores the log number "1" that is the same as the log number 311A of the corresponding entry into RAM 320, stores the resend flag "0" into RAM 320, and notifies print completion determination unit 304 (step S11).

Print completion determination unit 304 stores, into the completion flag in RAM 320, print completion flag "0" of the corresponding entry stored in job log table 311 whose log number is identical to the log number "1" stored in RAM 320, and notifies print control unit 305 (step S12). Then the process proceeds to step S13 in FIG. 4 via connection B.

Next, print control unit 305 determines that a next page (the 1st page) of the print data exists in RAM 320 (step S13) and the completion flag in RAM 320 appears "0" (step S14) and the resend flag in RAM 320 is "1" (step S15), and thereby, print control unit 305 transmits a page number "1" to be printed to unprinted page determination unit 306 (step S16).

Next, unprinted page determination unit 306 determines that the printed page "2" retrieved from printed range 311E of the corresponding entry stored in job log table 311 whose log number is identical to the log number "1" stored in RAM 320 is not less than the received page number "1" that is received from print control unit 305 (step S17), and thereby, unprinted page determination unit 306 informs print control unit 305 that the page corresponding to the received page number "1" is a printed page (step S18). Then the process proceeds back to step S13.

Next, print control unit 305 determines that a next page (the 2nd page) of the print data exists in RAM 320 (step S13) and the completion flag stored in RAM 320 is "0" (step S14) and the resend flag stored in RAM 320 is "1" (step S15), and thereby, print control unit 305 transmits a page number "2" to be printed to unprinted page determination unit 306 (step S16).

Next, unprinted page determination unit 306 determines that the printed page "2" retrieved from printed range 311E of the corresponding entry stored in job log table 311 whose log number is identical to the log number "1" stored in RAM 320 is not less than the received page number "2" that is received from print control unit 305 (step S17), and thereby, unprinted page determination unit 306 informs print control unit 305 that the page corresponding to the received page number "2" is a printed page (step S18). Then the process proceeds back to step S13.

Next, print control unit 305 determines that a next page (the 3rd page) of the print data exists in RAM 320 (step S13) and the completion flag stored in RAM 320 is "0" (step S14) and the resend flag stored in RAM 320 is "1" (step S15), and thereby, print control unit 305 transmits a page number "3" to be printed to unprinted page determination unit 306 (step S16).

Next, unprinted page determination unit 306 determines that the printed page "2" retrieved from printed range 311E of the corresponding the entry in job log table 311 whose log number is identical to the log number "1" stored in RAM 320 is less than the received page number "3" that is received from print control unit 305 (step S17), and thereby, unprinted page determination unit 306 informs print control unit 305 that the page corresponding to the received page number "3" is an unprinted page (step S19).

Print control unit 305 transmits the print data of the 3rd page to print unit 307 (step S20). Print unit 307 executes printing of the 3rd page (step S21), and then, since it is determined that the 3rd page is printed on the first side of a paper sheet for double-sided printing (step S22), print unit 307 turns over the paper sheet for printing a next page on the second side of the paper sheet (step S23).

Next, print control unit 305 determines that a next page (the 4th page) of the print data exists in RAM 320 (step S13) and the completion flag stored in RAM 320 is "0" (step S14) and the resend flag stored in RAM 320 is "1" (step S15), and thereby, print control unit 305 transmits a page number "4" to be printed to unprinted page determination unit 306 (step S16).

Next, unprinted page determination unit 306 determines that the printed page "2" retrieved from printed range 311E of the corresponding entry in job log table 311 whose log number is identical to the log number "1" stored in RAM 320 is less than the received page number "4" that is received from print control unit 305 (step S17), and thereby, unprinted page determination unit 306 informs print control unit 305 that the page corresponding to the received page number "4" is an unprinted page (step S19).

Print control unit 305 transmits the 4th page of the print data to print unit 307 (step S20). Print unit 307 executes printing of the 4th page (step S21), and then, since it is determined that the 4th page is printed on the second side of the paper sheet for double-sided printing (step S22), print unit 307 discharges the paper sheet out of the printer 300 and transmits a printed page number "4" to printed range store unit 308 (step S25). Printed range store unit 308 writes "4"

into printed range 311E of the corresponding entry in job log table 311 whose log number is identical to the log number "1" stored in RAM 320 (step S26).

Next, print control unit 305 determines that a next page (the 5th page) of the print data does not exist in RAM 320 (step S13), print control unit 305 thus deletes the print data in RAM that are no longer needed (step S27), and then, print control unit 305 determines that un-received print data exist (step S28), print control unit 305 thus notifies reception unit 301 (step S29).

Reception unit 301 resumes the reception (step S30), and the process proceeds back to step S01 in FIG. 3 via connection A. Reception unit 301 receives the remaining page (the 5th page) and stores the data into RAM 320 (step S01), reception unit 301 determines that the print data is completely received (step S02) and is not the first-part reception of the print data (step S05), and reception unit 301 notifies print control unit 305 (step S35). Then the process proceeds to step S13 in FIG. 4 via connection B.

Next, print control unit 305 determines that a next page (the 5th page) of the print data exists in RAM 320 (step S13) and the completion flag stored in RAM 320 is "0" (step S14) and the resend flag stored in RAM 320 is "1" (step S15), and thereby, print control unit 305 transmits a page number "5" to be printed to unprinted page determination unit 306 (step S16).

Next, since the printed page retrieved from printed range 311E of the corresponding entry in job log table 311 whose log number is identical to the log number "1" stored in RAM 320 is "4" that is written at step S26, unprinted page determination unit 306 determines that the printed page "4" is less than the received page number "5" that is received from print control unit 305 (step S17), and thereby, unprinted page determination unit 306 informs print control unit 305 that the received page number "5" is an unprinted page (step S19).

Print control unit 305 transmits the 5th page of the print data to print unit 307 (step S20). Print unit 307 executes printing of the 5th page (step S21), and then, since it is determined that the 5th page is printed on the first side of a paper sheet for double-sided printing (step S22), print unit 307 turns over the paper sheet for printing the second side of the paper sheet (step S23). Then the process proceeds back to step S13.

Next, print control unit 305 determines that a next page of the print data does not exist in RAM 320 (step S13), print control unit 305 thus deletes the print data in RAM 320 that are no longer needed (step S27). Next, print control unit 305 determines that un-received print data do not exist (step S28) and the un-discharged paper sheet exists, so the process proceeds to step S24 to discharge the sheet paper (step S24) and transmits a printed page number "5" to printed range store unit 308 (step S25). Printed range store unit 308 writes the received number "5" into printed range 311E of the corresponding entry in job log table 311 whose log number is identical to the log number "1" stored in RAM 320 (step S26), and the process proceeds back to step S13.

Next, print control unit 305 determines that a next page of the print data does not exist in RAM 320 (step S13), print control unit 305 thus deletes the print data in RAM 320 that are no longer needed (step S27). Next print control unit 305 determines un-received print data does not exist (step S28) and an un-discharged paper sheet does not exist (step S31), and thereby, print control unit 305 notifies print completion flag store unit 309 (step S32).

Print completion flag store unit 309 writes "1" into print completion flag 311F of the corresponding entry in job log table 311 whose log number is identical to the log number "1" stored in RAM 320 (step S33) and deletes the log number, resend flag and completion flag in RAM 320 (step S34), and then the process ends.

(Effects of the First Embodiment)

As described above, even though printer 300 is rebooted due to an error such as a paper jam, printer 300 of the first embodiment prevents duplicate printing of the pages that have been already printed before the error and prints only the pages that have not been printed, thereby preventing waste of paper.

Second Embodiment (Configuration)

The configuration of a printing apparatus of a second embodiment according to the invention will be described in detail with reference to FIG. 5 which shows a functional block diagram of the printing apparatus and personal computers according to the second embodiment.

Figure 5:
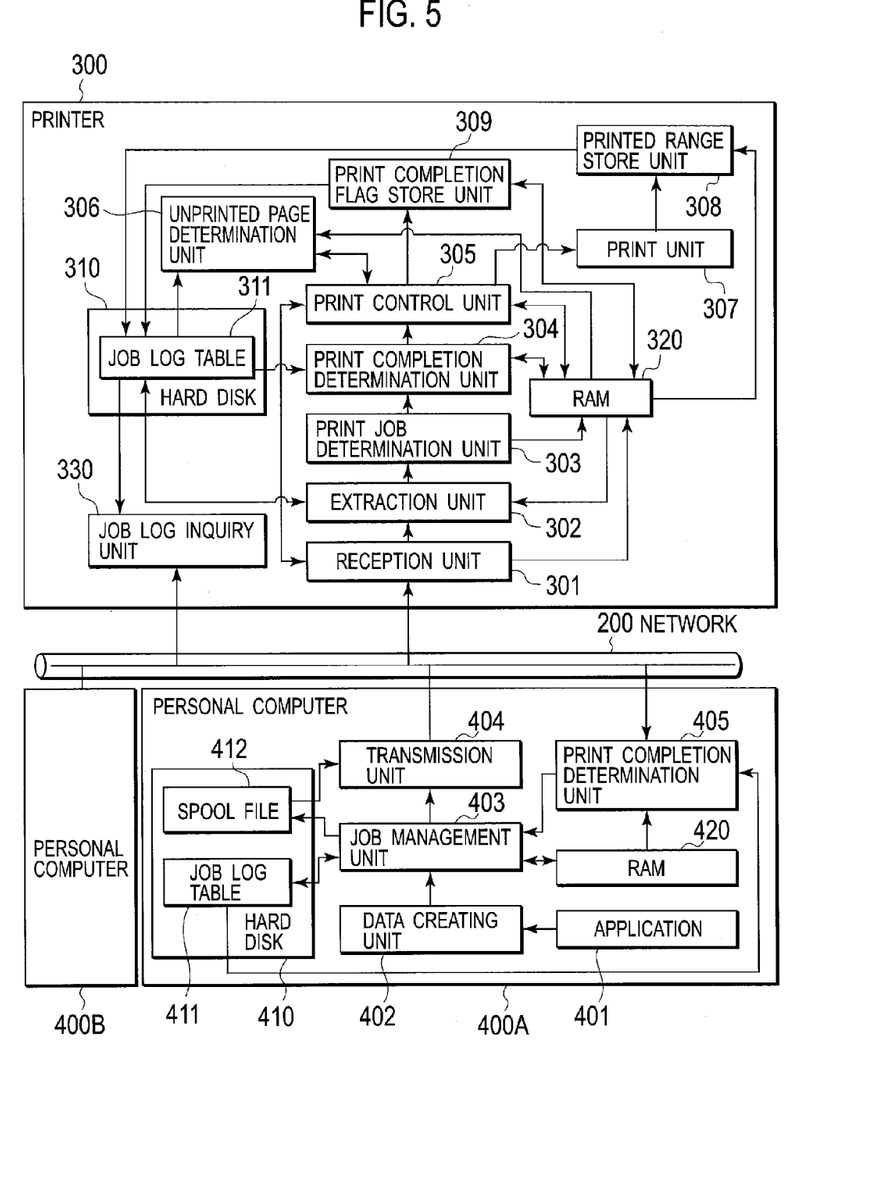
FIG. 5 is a functional block diagram of a printing apparatus of a second embodiment.

As shown in FIG. 5, printer 300 serving as a printing apparatus is connected to personal computer 400A and personal computer 400B serving as host apparatus via network 200 such that personal computers 400A and 400B and printer 300 can communicate with one another via network 200.

Upon a print instruction by application 401, personal computer 400A creates print data serving as first print data and sends printer 300 the print data. Personal computer 400A includes application 401, data creating unit 402, job management unit 403, transmission unit 404, print completion determination unit 405, hard disk 410 and RAM 420. Note that the internal configuration of personal computer 400B is not depicted in FIG. 5 but has the same configuration as that of personal computer 400A.

Hard disk 410 is a nonvolatile storage unit including job log table 411 and spool file 412. Spool file 412 stores print data created by data creating unit 402.

Figure 6:
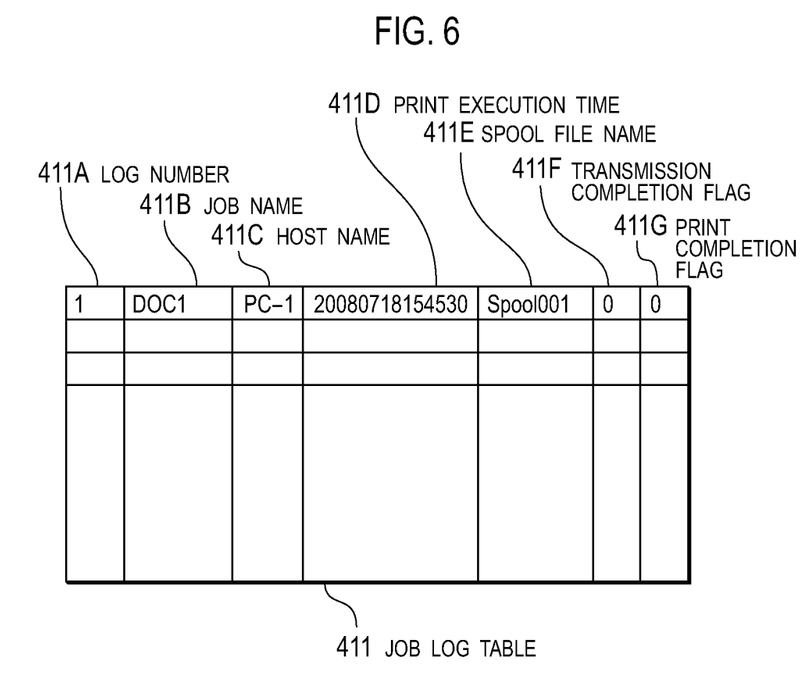
FIG. 6 is a block diagram of a job log table of the printing apparatus of the second embodiment.

As shown in FIG. 6, job log table 411 stores log number 411A, job name 411B, host name 411C, print execution time 411D, spool file name 411E, transmission completion flag 411F and print completion flag 411G, for each entry. A unique number indicating an entry into job log table 411 is stored in log number 411A.

A job name, a host name and a print execution time included in the print data are stored in job name 411B, host name 411C and print execution time 411D in job log table 411, respectively. A name of spool file 412 is stored in spool file name 411E in job log table 411.

In transmission completion flag 411F, "1" is stored if a transmission has been completed and "0" is stored if the transmission has not been completed. In print completion flag 411G, "1" is stored if a printing has been completed and "0" is stored if the printing has not been completed.

Referring back to FIG. 5, RAM 420 is a volatile storage unit and stores a log number that is a number identical to a log number of an entry in job log table 411 whose print data is currently transmitted to printer 300.

Application 401 creates a document, and instructs data creating unit 402 to create print data in response to a print instruction.

Data creating unit 402 creates print data, which is first data, including attribute information such as the job name, host name and print execution time, stores the data to spool file 412, adds a new entry to the job log table 411, writes a number that follows the latest log number into log number 411A, writes the job name, host name and print execution time included in the print data into job name 411B, host name 411C and print execution time 411D, respectively, writes the stored spool file name into spool file name 411E, writes "0" into transmission completion flag 411F, writes "0" into print completion flag 411G, and notifies job management unit 403.

Job management unit 403 reads the notification from data creating unit 402 and periodically reads out the entries in the job log table 411. If Job management unit 403 finds an entry whose transmission completion flag 411F is "0", job management unit 403 stores log number 411A of the corresponding entry into the log number of RAM 420 and notifies transmission unit 404 of spool file name 411E.

If an entry whose transmission completion flag 411F is "1" and whose print completion flag 411G is "0" is found, job management unit 403 transmits job name 411B, host name 411C and print execution time 411D of the corresponding entry to print completion determination unit 405. If job management unit 403 receives a notification of a print completion of the corresponding entry, job management unit 403 writes "1" into print completion flag 411G of the corresponding entry in job log table 411.

If job management unit 403 receives a notification of a print incompletion of the corresponding entry, job management unit 403 writes "0" into transmission completion flag 411F of the corresponding entry in job log table 411, stores log number 411A of the corresponding entry into the log number in RAM 420, and notifies transmission unit 404 of spool file name 411E whose print data, which will be second print data, is to be transmitted by transmission unit 404. If jog management unit 403 is notified that printing is in progress, jog management unit 403 reads out a next entry.

Transmission unit 404 transmits to printer 300 the print data stored in spool file 412 that corresponds to the received spool file name.

Print completion determination unit 405 transmits the job name, host name and print execution time that are received from job management unit 403 to job log inquiry unit 330 of printer 300, and notifies job management unit 403 of a result from job log inquiry unit 403 of printer 300.

Printer 300 includes job log inquiry unit 330 in addition to the configurations of the first embodiment. Explanation of the same configurations as those of the first embodiment is omitted to simplify the explanation.

If an entry does not exist in job log table 311 whose job name, host name and print execution time are all identical to job name, host name and print execution time that are received from one of personal computer 400A and personal computer 400B, job log inquiry unit 330 informs one of personal computer 400A and personal computer 400B that the printing is not completed.

If an entry exists in job log table 311 whose job name, host name and print execution time are all identical to the job name, host name and print execution time that are received from one of personal computer 400A and personal computer 400B and if print completion flag 311F of the corresponding entry is "1", job log inquiry unit 330 informs one of personal computer 400A and personal computer 400B that the printing is completed.

If print completion flag 311F of the corresponding entry is "0" and if the job number of the corresponding entry is identical to the job number in RAM 320, job log inquiry unit 330 informs one of personal computer 400A or personal computer 400B that printing is in progress. If the job number of the corresponding entry is not identical to the job number in RAM 320, job log inquiry unit 330 informs one of personal computer 400A or personal computer 400B that printing is not completed.

(Operation)

Figure 7:
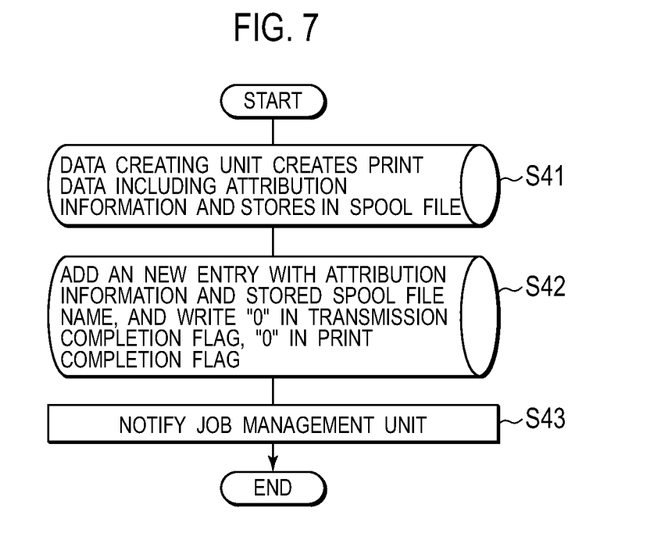
FIG. 7 is an operational flow chart of a data creating unit of the printing apparatus of the second embodiment.
Figure 8:
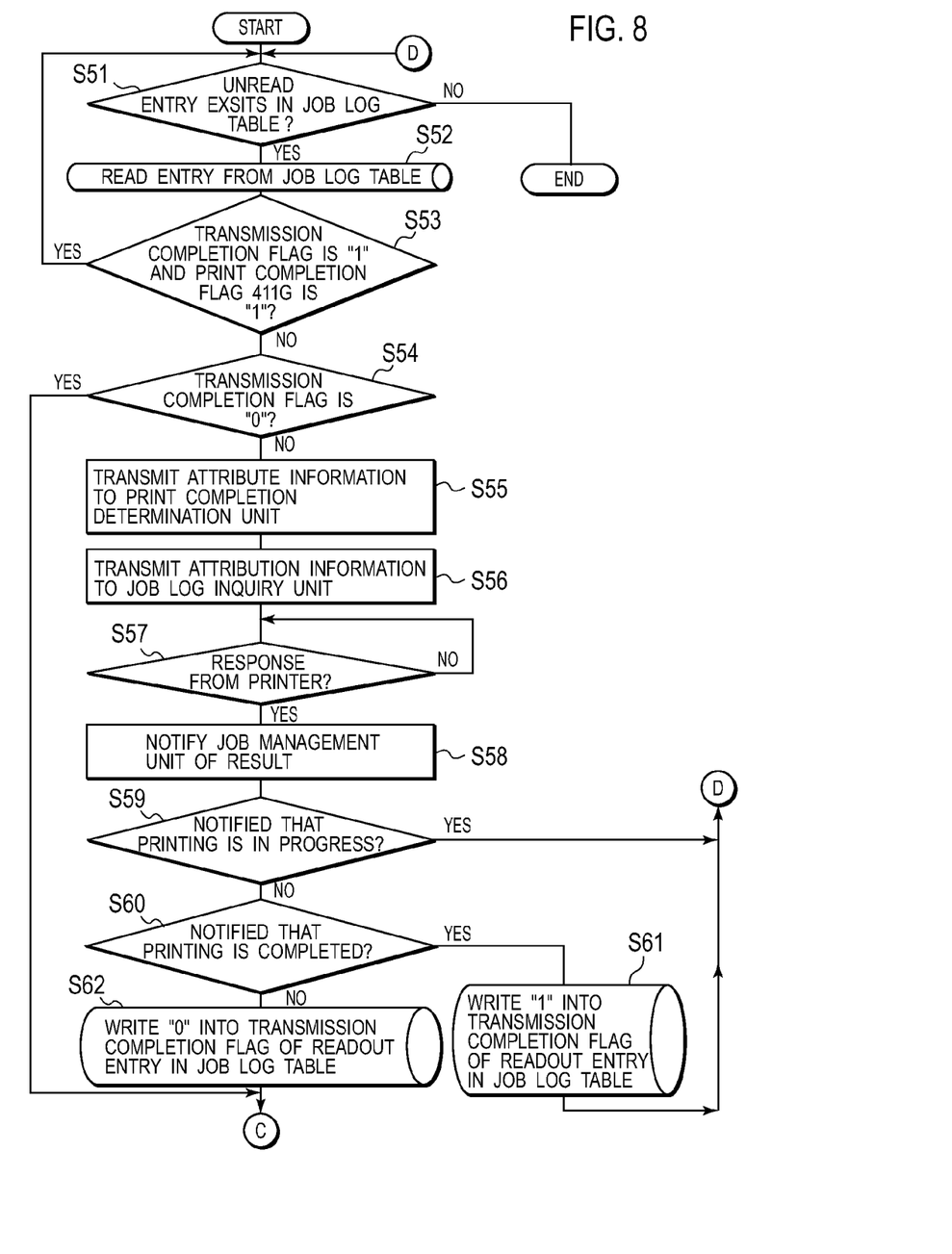
FIG. 8 is an operational flow chart of a personal computer of the second embodiment.
Figure 9:
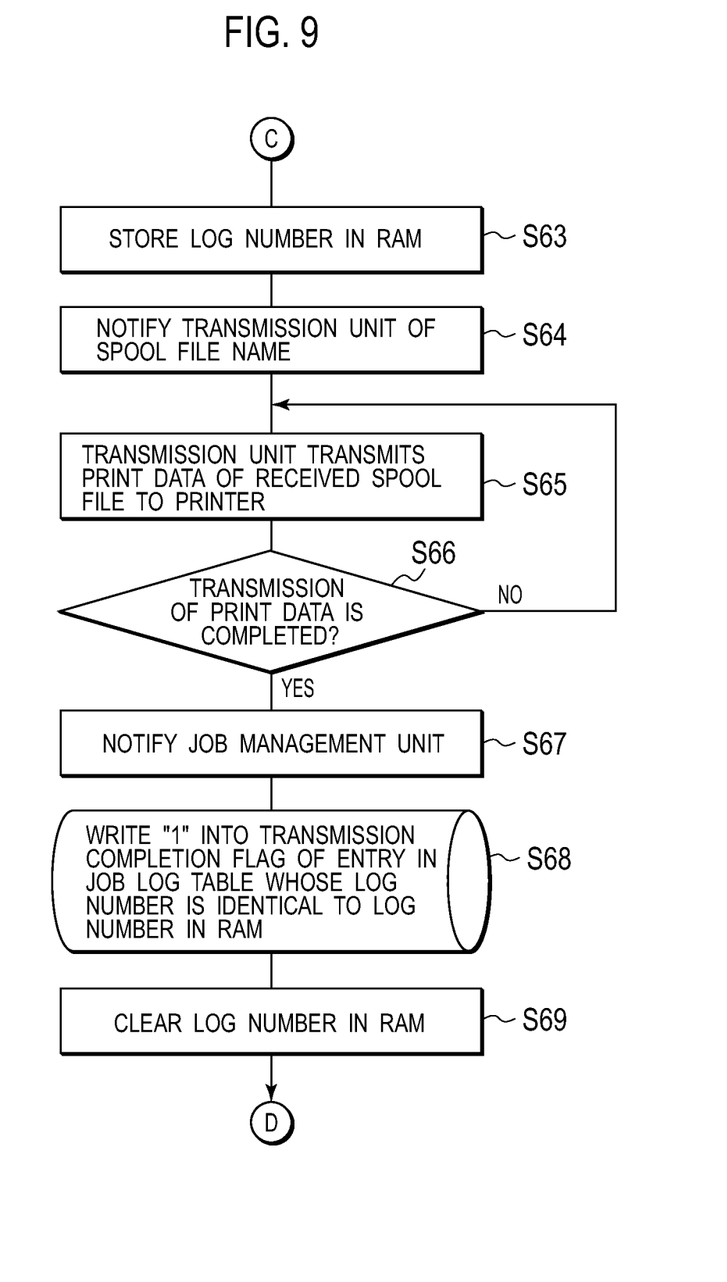
FIG. 9 is an operational flow chart of the personal computer of the second embodiment.
Figure 10:
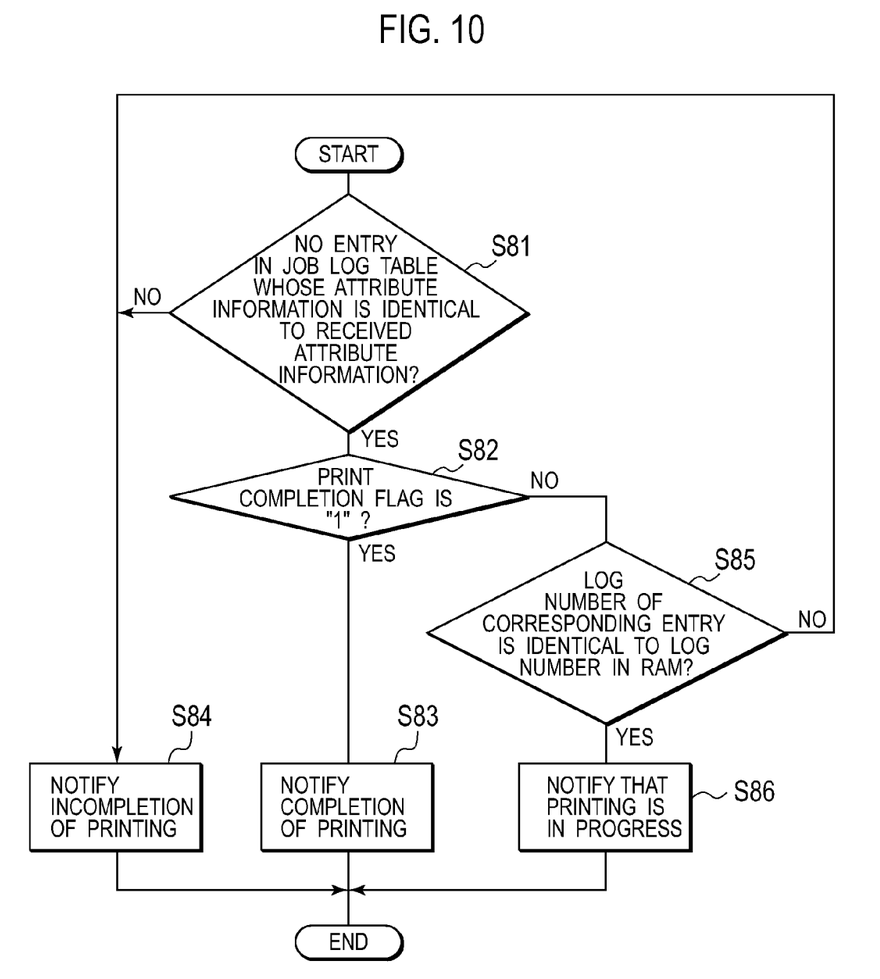
FIG. 10 is an operational flow chart of a job log inquiry unit of the printing apparatus of the second embodiment.

With the above configuration, the printing apparatus of the second embodiment operates as follows. The operation will be described in detail with reference to FIGS. 7 to 10 wherein FIG. 7 is a flow chart of the operation of creating unit 402, FIGS. 8 and 9 show a flow chart of the operation of personal computer 400A or 400B when transmitting print data to printer 300, and FIG. 10 is a flow chart of the operation of job log inquiry unit 330. Note that the operation of a personal computer of the second embodiment is shown through FIGS. 8 and 9, wherein the flow in FIG. 8 and the flow in FIG. 9 are linked to each other via connections A and B.

The following description describes in detail an example of the operation of the second embodiment, assuming that personal computer 400A having the host name of "PC-1" creates print data having a job name of "DOC1" for 4-page double-sided printing at "15:45 and 30 seconds on Jul. 18, 2008", the personal computer 400A sends the 4-pages print data to printer 300, printer 300 prints 3 pages of the print data, a paper jam occurs in printer 300 when printer 300 prints the 4th page after having printed 3 pages, printer 300 is turned off and on to be rebooted, personal computer 400B having the host name of "PC-2" creates print data having a job name of "DOC2" for 1-page single-sided printing at "15:46 and 15 seconds on Jul. 18, 2008", personal computer 300 sends the 1-page print data to printer 300, printer 300 prints 1st page of the print data, and then personal computer 400A resends the same print data to printer 300.

First, in personal computer 400A, upon a print instruction by application 401, data creating unit 402 creates print data including "the host name PC-1", "the job name DOC1" and "print execution time 20080718154530" and stores the print data under the name of "spool001" into spool file 412 (step S41).

Job log table 411 adds a new entry by writing "1" in log number 411A, "DOC1" in job name 411B, "PC-1" in host name 411C, "20080718154530" in print execution time 411D, "spool001" in spool file name 411E, "0" in transmission completion flag 411F, "0" in print completion flag 411G (step S42), and notifies job management unit 403 (step S43).

Next, job management unit 403 determines that at least one entry exists in job log table 411 (step S51), job management unit 403 thus reads the 1st entry (step S52). Next, job management unit 403 determines that transmission completion flag 411F of the readout entry is "0" (step S53, S54), job management unit 403 thus proceeds to step S63 and stores "1" that is stored in log number 411A into the log number of RAM 420 (step S63), and notifies transmission unit 404 of the file name "spool001" in spool file name 411E (step S64).

Transmission unit 404 transmits the print data named "spool001" and stored in spool file 412 to printer 300 (step S65), and then, after completely transmitting the print data (step S66), notifies job management unit 403 (step S67).

Job management unit 403 writes "1" into transmission completion flag 411F of the entry in job log table 411 whose log number is identical to the log number stored in RAM 420 (step S68), clears the log number in RAM 420 (step S69), proceeds back to step S51 in FIG. 8 via connection D. Next, job management unit 403 determines that a next entry does not exist in job log table 411 (step S51), and thereby, ends the process.

The printing operation in printer 300 based on the print data that are transmitted to printer 300 in step S65 is the same as that of printer 300 of the first embodiment described above with reference to FIGS. 3 and 4, so the duplicate explanation is omitted to simplify the explanation.

Referring back to FIG. 8, after a predetermined time has elapsed in personal computer 400, job management unit 403 determines that an entry exists in job log table 411 (step S51), job management unit 403 thus reads the 1st entry (step S52). Next, job management unit 403 determines that transmission completion flag 411F is "1" and print completion flag 411G is "0" (step S53, S54), job management unit 403 thus transmits "job name DOC1", "host name PC-1" and "print execution time 20080718154530" to print completion determination unit 405 (step S55). Print completion determination unit 405 transmits "job name DOC1", "host name PC-1" and "print execution time 20080718154530" to job log inquiry unit 330 in printer 300 (step S56).

Next, as shown in FIG. 10, job log inquiry unit 330 determines that the corresponding entry whose job name, host name and print execution time is identical to "job name DOC1", "host name PC-1" and "print execution time 20080718154530" that are transmitted to job log inquiry unit 330 exists in job log table 311 (step S81), print completion flag 311F of the corresponding entry is "0" (step S82) and log number "1" of the corresponding entry is not identical to the log number in RAM 320 (step S85), and thereby, job log inquiry unit 330 in printer 300 proceeds to step S84 to notify print completion determination unit 405 in personal computer 400A of print incompletion (step S84).

Referring back to FIG. 8, when notified by printer 300 of the result (the print incompletion) (step S57), print completion determination unit 405 notifies job management unit 403 of the result (step S58). Being notified of the print incompletion (step S59, S60), job management unit 403 writes "0" into transmission completion flag 411F of the readout entry in job log table 411 (step S62), proceeds to step S63 in FIG. 9 via connection C, stores log number "1" into the log number of RAM 420 (step S63), and notifies transmission unit 404 of spool file name "spool001" (step S64).

Transmission unit 404 transmits print data whose file name is "spool001" in spool file 412 to printer 300 (step S65), and then, after completely transmitting the print data (step S66), notifies job management unit 403 (step S67). Job management unit 403 writes "1" into transmission completion flag 411F of an entry in the job log table 411 whose log number is identical to the log number stored in RAM 420 (step S68), clears the log number in RAM 420 (step S69), proceeds to step S51 in FIG. 8 via connection D. Next, job management unit 403 determines that no next entry exists in the job log table 411 (step S51), and thereby, ends the process.

The printing operation in printer 300 based on the print data that are transmitted to printer 300 in step S65 is the same as that of printer 300 of the first embodiment described above with reference to FIGS. 3 and 4, so the duplicate explanation is omitted to simplify the explanation.

Then, after a predetermined time has elapsed in personal computer 400, job management unit 403 determines that a new entry exists in job log table 411 (step S51), job management unit 403 thus reads the 1st entry (step S52). Next, job management unit 403 determines that transmission completion flag 411F is "1" and print completion flag 411G is "0" (step S53, S54), job management unit 403 thus transmits "job name DOC1", "host name PC-1" and "print execution time 20080718154530" to print completion determination unit 405 (step S55).

Print completion determination unit 405 transmits "job name DOC1", "host name PC-1" and "print execution time 20080718154530" to job log inquiry unit 330 in printer 300 (step S56).

Next, as shown in FIG. 10, job log inquiry unit 330 determines that the corresponding entry whose job name, host name and print execution time are identical to "job name DOC1", "host name PC-1" and "print execution time 20080718154530" that are received from print completion determination unit 405 exists in job log table 311 (step S81) and job log inquiry unit 330 determines that print completion flag 311F of the corresponding entry is "1" (step S82), and thereby, job log inquiry unit 330 in printer 300 notifies print completion determination unit 405 in personal computer 400A of the print completion (step S83).

Back to FIG. 8, being notified by printer 300 of the result (the print completion) (step S57), print completion determination unit 405 notifies job management unit 403 of the result (step S58). Being notified of the print completion (step S59, S60), job management unit 403 writes "1" into transmission completion flag 411F of the readout entry in job log table 411 (step S62), proceeds back to step S51 via connection D. Next, job management unit 403 determines that no next entry exists in the job log table 411 (step S51), and thereby, ends the process.

(Effects of the Second Embodiment)

As described above, even though printer 300 is turned off due to an error such as a paper jam, the printing system according to the second embodiment can prevent duplicate printing of pages that have already been printed before a reboot and can print, after the reboot, only pages that have not been printed, and thereby preventing wasted paper.

Other Modifications

Although the above described embodiments explain examples of double-sided printing, the invention can be applied to multi-layout printing such as a multi-page printing per sheet or the like as well as double-sided printing.

Further, although the above described embodiments explain examples in which the printer is rebooted after a paper jam occurs, the invention can be applied to a case where the printer is rebooted due to other causes other than a paper jam, such as a case where the printer is rebooted after the printing process does not start due to an instable or poor connection.

Further, the above described embodiments explain the example in which the personal computer resends the same print data to the printer after the printer is rebooted, the invention includes a modification wherein the personal computer creates print data with a header including a total page number thereof, a printer receives the print data and stores the total page number of the received print data and the number of the page that has been printed into a nonvolatile storage, and the printer notifies the personal computer of a job name of the print data and an unprinted or printed pages of the print data when the personal computer or application of the personal computer is rebooted due to an error such as an incompletion of transmitting the print data after an internal error in the personal computer.

Further, the invention can be applied to not only a printer but also other printing apparatuses such as a copy machine, an MFP (multifunction peripheral) and the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A printing apparatus for printing based on first print data received by the print apparatus and second print data received by the printing apparatus after the first print data is received, the printing apparatus comprising:
   a printed range store unit that includes a tangible, non-volatile memory and is configured to store a printed range, which is a part of the first print data that is completely printed;
   a print completion determination unit configured to determine whether or not the printing of the first print data has been completed;
   a print job determination unit configured to determine, when the second print data is received by the printing apparatus, whether or not the second print data corresponds with the first print data;
   an unprinted page determination unit configured to determine unprinted pages of the second print data based on the print range stored by the printed range store unit, when the print job determination unit determines that the second print data correspond with the first print data; and
   a print control unit configured to instruct a print unit to print based on the second print data and the result of the unprinted page determination unit, wherein the apparatus prints no pages of the second print data when it is determined that the second print data corresponds to the first print data and the printing of the first print data has been completed.

2. The printing apparatus according to claim 1, wherein the printed range is a range from the first page to the last printed page.

3. The printing apparatus according to claim 1, wherein the printed range is counted based on a set of pages that was printed.

4. The printing apparatus according to claim 1, wherein the printed range is counted on a sheet basis, based on a set of pages that was fully printed on a sheet for multi-page printing per sheet or for double sided printing.

5. The printing apparatus according to claim 1, wherein the first print data and the second print data each include attribute information, and
the print job determination unit determines whether or not the second print data correspond with the first print data based on the attribute information.

6. The printing apparatus according to claim 5, wherein the attribute information includes any one or two of a job name, a host name and a print execution time.

7. The printing apparatus according to claim 1, wherein the print completion determination unit determines whether or not the printing of the first print data has been completed based on the printed range and the second print data.

8. The printing apparatus according to claim 1, further comprising
   a print completion flag store unit that stores a print completion flag which shows a status of whether or not the printing of the first print data is completed,
      wherein the print completion determination unit determines whether or not the printing is completed based on the print completion flag.

9. A printing system comprising:
   a host apparatus; and
   a printing apparatus configured to execute printing based on print data received from the host apparatus,
   the host apparatus comprising:
   a transmission unit configured to transmit print data to the printing apparatus;
   a first print completion determination unit configured to determine whether or not printing of the print data has been completed; and
   a print job management unit configured to transmit via the transmission unit second print data which are the same print job as first print data that were transmitted to the printing apparatus prior to the second print data, when the first print completion determination unit determines that the printing of the first print data has not been completed in the printing apparatus after the first print data were transmitted from the transmission unit,
   the printing apparatus comprising:
   a printed range store unit that includes a tangible, non-volatile memory and is configured to store a printed range, which is a part of the first print data that has been printed completely;
   a second print completion determination unit configured to determine whether or not the printing of the first print data has been completed;
   a print job determination unit configured to determine, when the second print data is received by the printing apparatus, whether or not the second print data corresponds with the first print data;
   an unprinted page determination unit configured to determine unprinted pages of the second print data based on the print range stored by the printed range store unit, when the print job determination unit determines that the second print data corresponds with the first print data; and
   a print control unit configured to instruct a print unit to print based on the second print data and the unprinted page determination unit, wherein the printing apparatus prints no pages of the second print data when it is determined that the second print data corresponds to the first print data and the printing of the first print data has been completed.

10. The printing system according to claim 9, wherein the printed range is a range from the first page to the last printed page.

11. The printing system according to claim 9, wherein the printed range is counted based on a set of pages that was printed.

12. The printing system according to claim 9, wherein the printed range is counted on a sheet basis, based on a set of pages that was fully printed on a sheet for multi-page printing per sheet or for double sided printing.

13. The printing system according to claim 9, wherein the first print data and the second print data each include attribute information, and
the print job determination unit determines whether or not the second print data correspond with the first print data based on the attribute information.

14. The printing system according to claim 13, wherein the attribute information includes any of one or two of a job name, a host name and a print execution time.

15. The printing system according to claim 9, wherein the print completion determination unit determines whether or not the printing of the first print data has been completed based on the printed range and the second print data.

16. The printing system according to claim 9, further comprising
   a print completion flag store unit that stores a print completion flag which shows a status of whether or not the printing of the first print data is completed, wherein the second print completion determination unit determines whether or not the printing is completed based on the print completion flag.

17. A printing apparatus for printing based on print data received by the printing apparatus, comprising:
- a print job determination unit configured to determine whether or not second print data corresponds with previous print data received by the printing apparatus prior to the second print data, when the second print data is received by the printing apparatus;
- a page determination unit that includes a tangible, non-volatile memory and is configured to determine unprinted pages or printed pages of the previous print data, when the print job determination unit determines that the second print data correspond with the previous print data; and
- a print control unit configured to instruct a print unit to print the second print data based on the determination result of the unprinted page determination unit, wherein the apparatus prints no pages of the second print data when it is determined that the second print data corresponds to the first print data and the printing of the first print data has been completed.

\* \* \* \* \*